(12) United States Patent
Hayashi

(10) Patent No.: US 8,351,693 B2
(45) Date of Patent: Jan. 8, 2013

(54) IMAGE COMPRESSION APPARATUS AND COMPUTER-READABLE RECORDING MEDIUM RECORDED WITH IMAGE COMPRESSION PROGRAM

(75) Inventor: Shinji Hayashi, Osaka (JP)

(73) Assignee: Kyocera Mita Corporation (JP)

( * ) Notice: Subject to any disclaimer, the term of this patent is extended or adjusted under 35 U.S.C. 154(b) by 294 days.

(21) Appl. No.: 12/869,064

(22) Filed: Aug. 26, 2010

(65) Prior Publication Data

US 2011/0052052 A1    Mar. 3, 2011

(30) Foreign Application Priority Data

Aug. 28, 2009   (JP) ................................. 2009-197697

(51) Int. Cl.
*G06K 9/00* (2006.01)
*G06K 9/36* (2006.01)
(52) U.S. Cl. ........................................ 382/166; 382/240
(58) Field of Classification Search .................. 382/162, 382/166, 232, 240
See application file for complete search history.

(56) References Cited

U.S. PATENT DOCUMENTS

| 7,676,097 B2 * | 3/2010 | Sakai | 382/240 |
| 7,693,345 B2 * | 4/2010 | Pore et al. | 382/166 |

FOREIGN PATENT DOCUMENTS

JP    05-114240    5/1993

* cited by examiner

*Primary Examiner* — Duy M Dang
(74) *Attorney, Agent, or Firm* — Gerald E. Hespos; Michael J. Porco

(57) ABSTRACT

A pattern data storage stores a plurality of different pattern data having the same data size as bit planes. An image compressing/decoding unit calculates code amounts of the respective encoded bit planes and successively adds the code amounts of the respective bit planes in decreasing order from that of the bit plane of the most significant bit to such an extent that the sum does not exceed a limited code amount. Then, the image compressing/decoding unit selects the bit planes with highest degrees of coincidence by comparing the bit planes other those whose code amounts were added to such an extent that the sum does not exceed the limited code amount and the respective pattern data stored in the pattern data storage and replaces the bit planes by the selected pattern data.

5 Claims, 13 Drawing Sheets

FIG. 3

| A | B | C | D | E |
|---|---|---|---|---|
| F | G | H | J | K |
| L | M | N | P | Q |
| R | S | T | U | V |

FIG. 11

|  | 0 | 1 | 0 | 1 | 0 | 1 | 0 | 1 | 0 | 1 | 0 | 1 | NO. | x4bit |
|---|---|---|---|---|---|---|---|---|---|---|---|---|---|---|
| 8th BIT | 16 | | | | | | | | | | | | 1 | 4 |
| 7th BIT | 0 | 1 | 2 | 2 | 11 | | | | | | | | 5 | 20 |
| 6th BIT | 1 | 3 | 1 | 1 | 7 | 1 | 2 | | | | | | 7 | 28 |
| 5th BIT | 0 | 2 | 3 | 3 | 8 | | | | | | | | 5 | 20 |
| 4th BIT | 4 | 2 | 2 | 3 | 1 | 1 | 1 | 1 | 1 | | | | 9 | 36 |
| 3rd BIT | 4 | 7 | 4 | 1 | | | | | | | | | 4 | 16 |
| 2nd BIT | 1 | 1 | 1 | 1 | 1 | 1 | 3 | 1 | 1 | 1 | 1 | 3 | 12 | 48 |
| 1st BIT | 3 | 2 | 4 | 2 | 2 | 1 | 2 | | | | | | 7 | 28 |

FIG. 12

IMAGE COMPRESSION APPARATUS AND COMPUTER-READABLE RECORDING MEDIUM RECORDED WITH IMAGE COMPRESSION PROGRAM

BACKGROUND OF THE INVENTION

1. Field of the Invention

The present invention relates to an image compression apparatus for compressing an image data and a computer-readable recording medium recorded with an image compression program.

2. Description of the Background Art

In recent years, with the development of digital equipment, various compression methods for image data and the like have been proposed. JPEG (Joint Photographic Experts Group) 2000 is known as one of compression methods. JPEG2000 specifies a method for compressing and developing images and is a development of JPEG. JPEG2000 divides an image data into a plurality of tiles and performs a compression process through wavelet transform and quantization for each tile and arithmetic coding for each bit plane. A degree of influence on image quality is calculated for each bit plane and encode data are successively output from the bit planes in order of decreasing degree of influence and coding is so performed that all the bit planes, which has not been encoded yet when a compression ratio designated by a user or the like is reached, becomes data with all "0"s or "1"s. Such rounding of lower bits is described in detail in Japanese Unexamined Patent Publication No. H05-114240.

SUMMARY OF THE INVENTION

The present invention is a further improvement of the conventional technology described above.

Specifically, the present invention is directed to an image compression apparatus, including a conversion unit, a division unit, a wavelet transform unit, a quantization unit, a coding unit, a storage unit, a determination unit, a selection unit, a replacement unit. The conversion unit is configured to convert the color system of an input image data into the one composed of luminance components and color difference components. The division unit is configured to divide the converted image data into a plurality of tiles. The wavelet transform unit is configured to perform wavelet transform on each divided tile. The quantization unit is configured to quantize each wavelet-transformed tile. The coding unit is configured to code the quantized tiles by developing them into bit planes. The storage unit is configured to store a plurality of different pattern data having the same data size as the bit planes. The determination unit is configured to determine the bit planes having a small influence on image quality after decoding out of the developed bit planes. The selection unit is configured to select the pattern data with a highest degree of coincidence with each determined bit plane by comparing the bit plane determined to have a small influence on image quality by the determination unit and the respective pattern data stored in the storage unit. And the replacement unit is configured to replace each bit plane determined to have a small influence on image quality by the determination unit by the pattern data selected as the one with the highest degree of coincidence with the determined bit plane by the section unit.

Other objects of the present invention and specific advantages obtained by the present invention will become more apparent upon reading the following description of an embodiment.

BRIEF DESCRIPTION OF THE DRAWINGS

FIG. 3 is a diagram showing tile division, FIGS. 4A,B,C are diagrams showing discrete wavelet transform, FIG. 11 is a table showing encoded data when bit planes are encoded by a run-length method, FIG. 12 is a diagram showing an exemplary data configuration of a pattern data storage.

DESCRIPTION OF THE PREFERRED EMBODIMENTS

Figure 1:
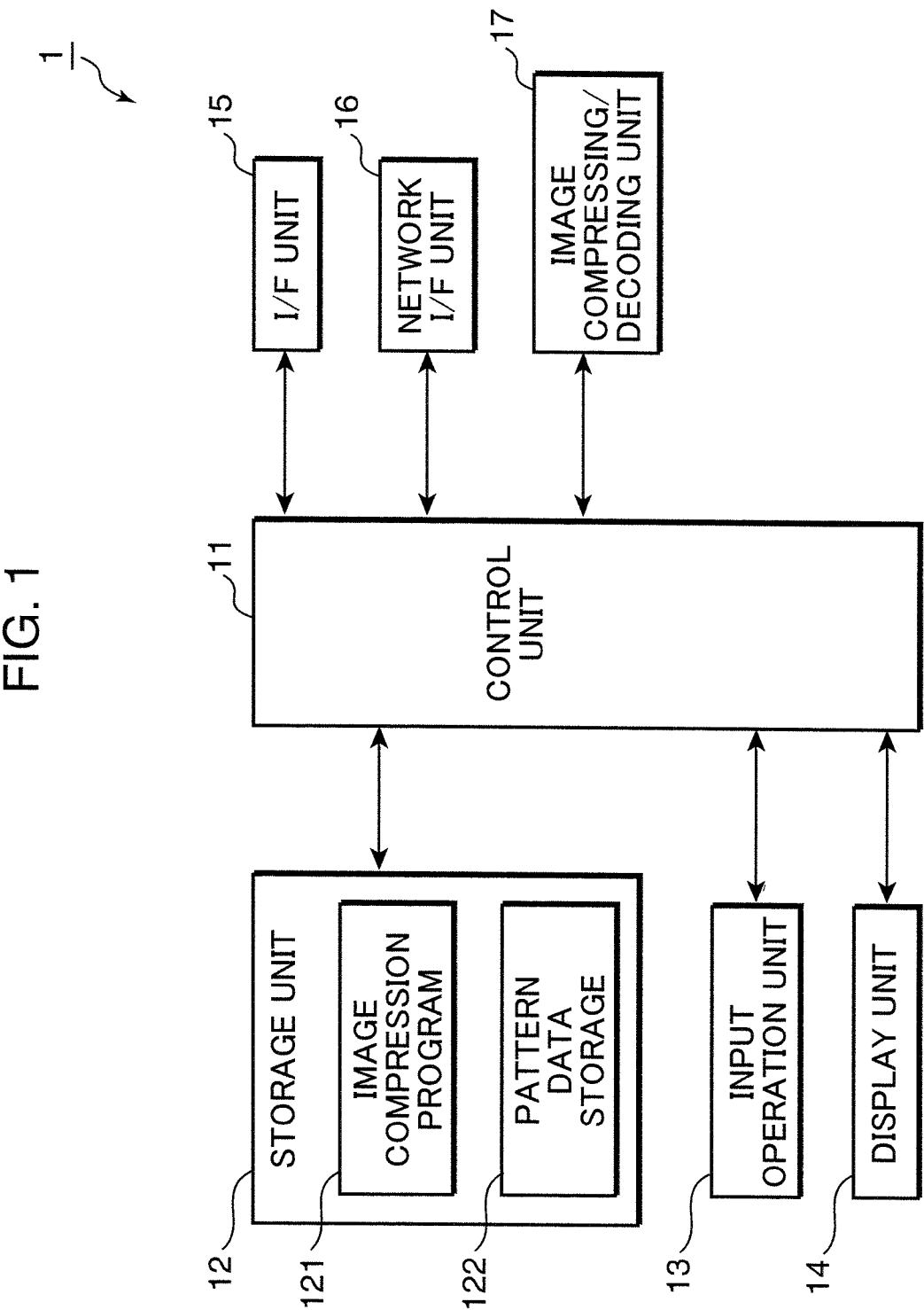
FIG. 1 is a block diagram showing an electrical construction of an image compression apparatus.

An image compression apparatus and an image compression program according to one embodiment of the present invention are described with reference to the drawings. FIG. 1 is a block diagram showing an electrical construction of an image compression apparatus 1 of this embodiment. The image compression apparatus 1 is realized by an information processing apparatus such as a personal computer, a work station or a personal digital assistance, and an example in which the image compression apparatus 1 is realized by one of these information processing apparatuses is illustrated in the block diagram of FIG. 1. Besides, the image compression apparatus 1 may be used by being incorporated into an image reading apparatus such as a copier or a scanner or an image pickup apparatus such as a digital camera, a digital video camera or a mobile phone equipped with a digital camera.

As shown in FIG. 1, the image compression apparatus 1 includes a control unit 11, a storage unit 12, an input operation unit 13, a display unit 14, an I/F unit 15, a network I/F unit 16 and an image compressing/decoding unit 17. The control unit 11 includes a CPU (Central Processing Unit), reads a program stored in the storage unit 12, performs a process in accordance with an input instruction signal or the like, and controls the entire image compression apparatus 1 by outputting instruction signals and transferring data and the like to the respective functional units.

The storage unit 12 stores a program, data and the like for realizing various functions of the image compression apparatus 1. In this embodiment, the storage unit 12 stores an image compression program 121 and functions as a pattern data storage 122. The image compression program 121 is for generating an encoded data by compressing an image data input through the I/F unit 15 or the network I/F unit 16 by JPEG2000. The pattern data storage 122 stores a plurality of mutually different pattern data having the same data size as bit planes to be developed by the image compressing/decoding unit 17. This pattern data storage 122 is described in detail later.

The input operation unit 13 includes pointing devices such as various operation buttons and a mouse and outputs an operation signal to the control unit 11 when being operated by a user. The user sets a compression rate via the input operation unit 13. The display unit 14 is a display screen such as a liquid crystal display and adapted to show a display according to a content input from the input operation unit 13 and display a process content and a process result by the control unit 11.

The I/F unit 15 is an interface such as an IEEE1394 or a USB and can directly transmit and receive data to and from external apparatuses. The network I/F unit 16 includes a communication module such as a LAN board and is adapted to transmit and receive various data to and from external apparatuses via a network (not shown) connected with the network I/F unit 16. The image compressing/decoding unit 17 compresses an image data input via the I/F unit 15 or the network I/F unit 16 by JPEG2000 to generate a compressed data by executing the image compression program 121 stored in the storage unit 12. The image compressing/decoding unit 17 also decodes the compressed data.

Figure 2:
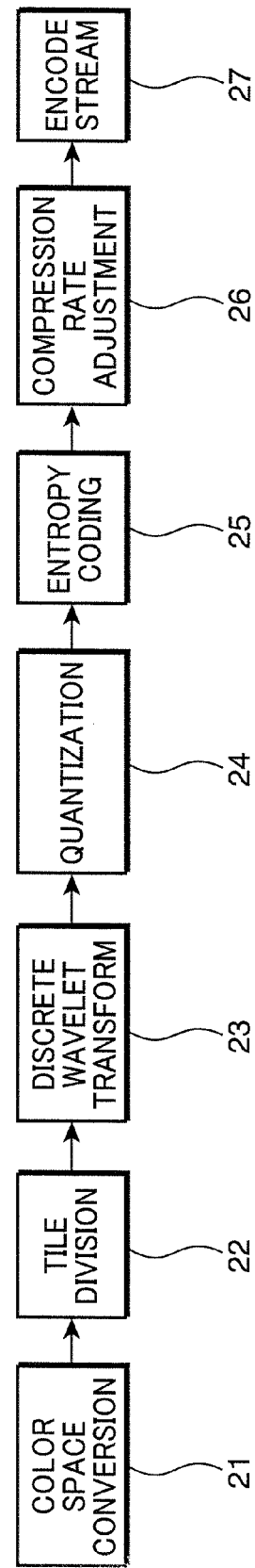
FIG. 2 is a diagram showing a flow of image compression by JPEG2000.
Figure 3:
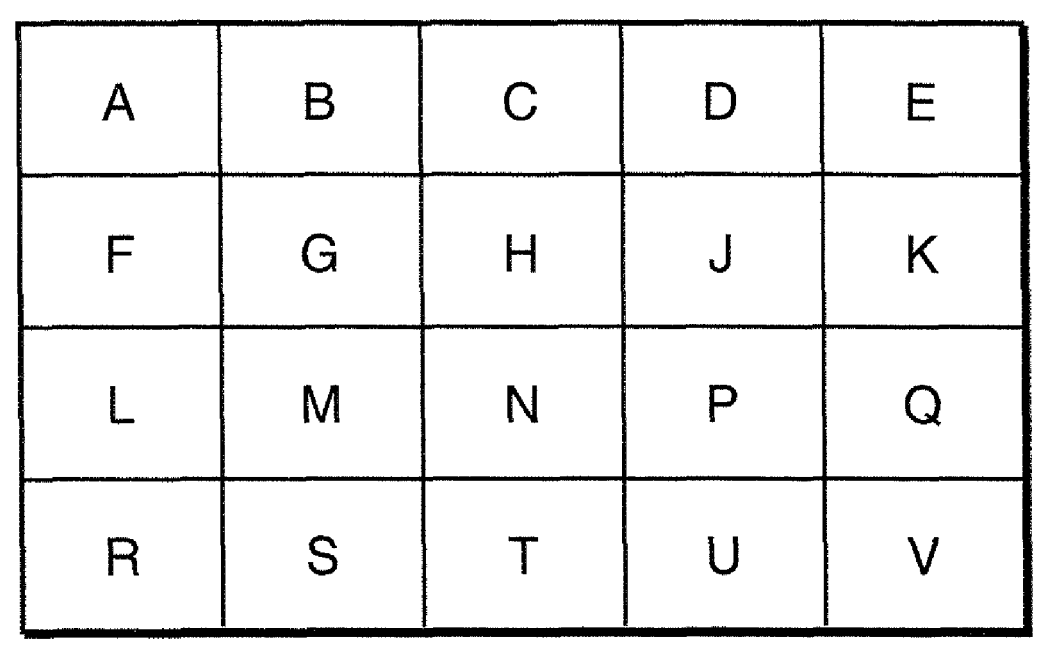

FIG. 2 is a diagram showing a flow of image compression by JPEG 2000 in this embodiment. First of all, the image compressing/decoding unit 17 component converts the color system of an input image data, for example, from an RGB system into a YCbCr system (color space conversion 21) and divides the image data whose color system was converted into a plurality of tiles as shown in FIG. 3 (tile division 22).

Figure 4:
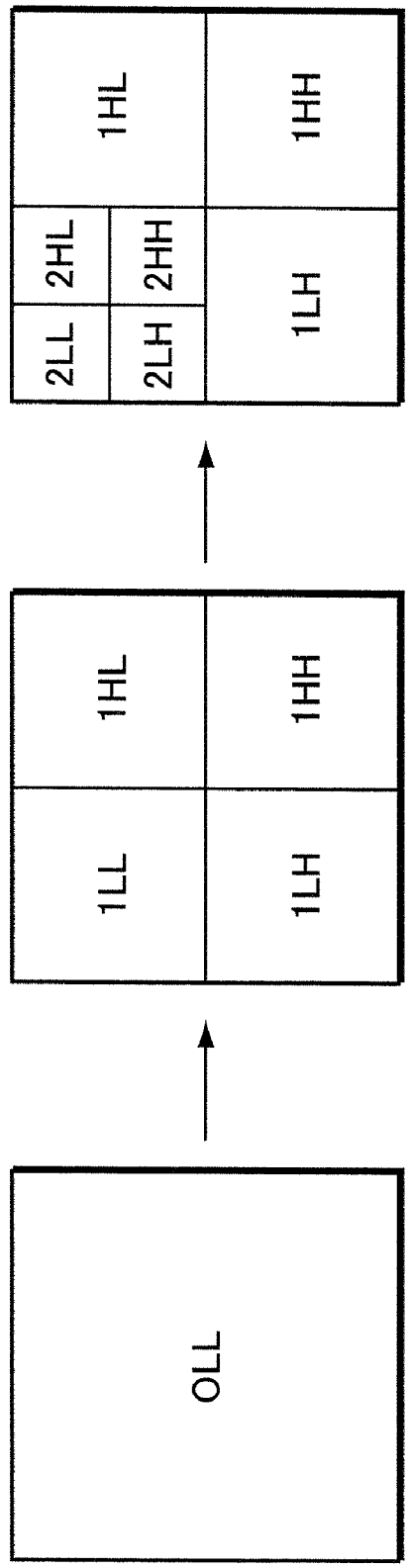

The image compressing/decoding unit 17 outputs coefficient data by performing discrete wavelet transform on the respective tiles of one band (discrete wavelet transform 23). FIG. 4 are diagrams showing the discrete wavelet transform. The discrete wavelet transform is performed on a tile image (0LL) of FIG. 4A to decompose it into subbands 1LL, 1HL, 1LH and 1HH as shown in FIG. 4B. Subsequently, the discrete wavelet transform is performed on a low-frequency component 1LL to decompose it into subbands 2LL, 2HL, 2LH and 2HH as shown in FIG. 4C. Although two-level transform is shown in FIG. 4, the number of the discrete wavelet transforms is not particularly restricted.

Figure 5:
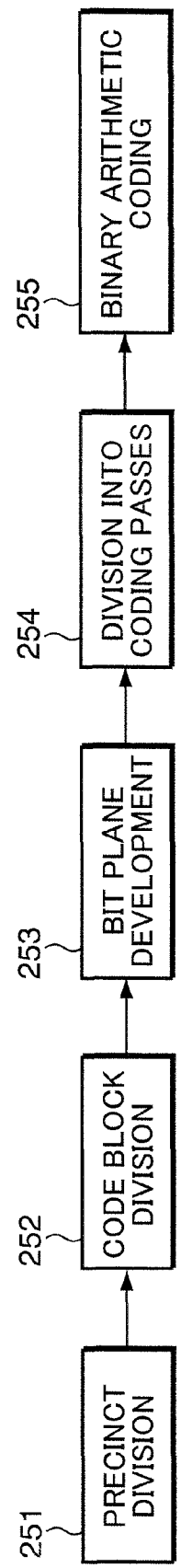
FIG. 5 is a diagram showing a flow of entropy coding.
Figure 6:
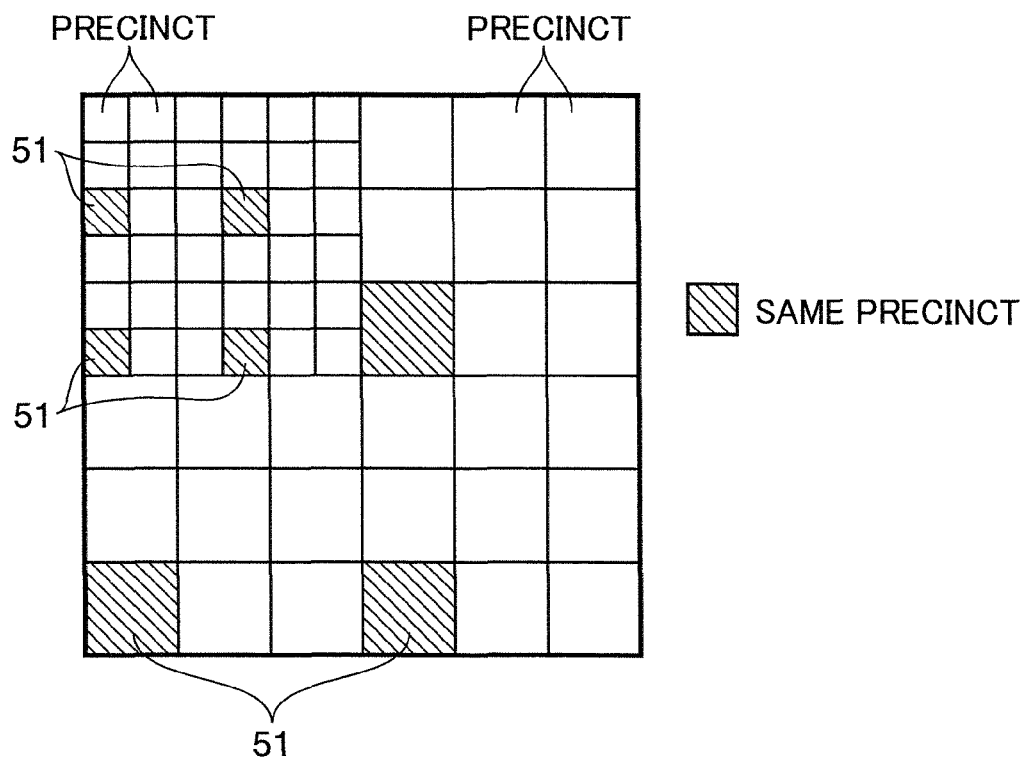
FIG. 6 is a view diagrammatically showing precinct division.

Subsequently, the image compressing/decoding unit 17 performs linear quantization on the coefficient data obtained by the discrete wavelet transform (quantization 24) and performs entropy coding on the quantized data quantized at the compression rate set by the user or the like (hereinafter, called "set compression rate") (entropy coding 25). Here, a process procedure of the entropy coding 25 is described. FIG. 5 is a diagram showing a flow of the entropy coding. The image compressing/decoding unit 17 first divides a coefficient of each subband into areas called precincts (precinct division 251). FIG. 6 is a view diagrammatically showing the precinct division. In FIG. 6, parts 51 are those obtained by frequency-converting parts in the same area of an original image, and these parts are said to belong to the same precinct.

Figure 7:
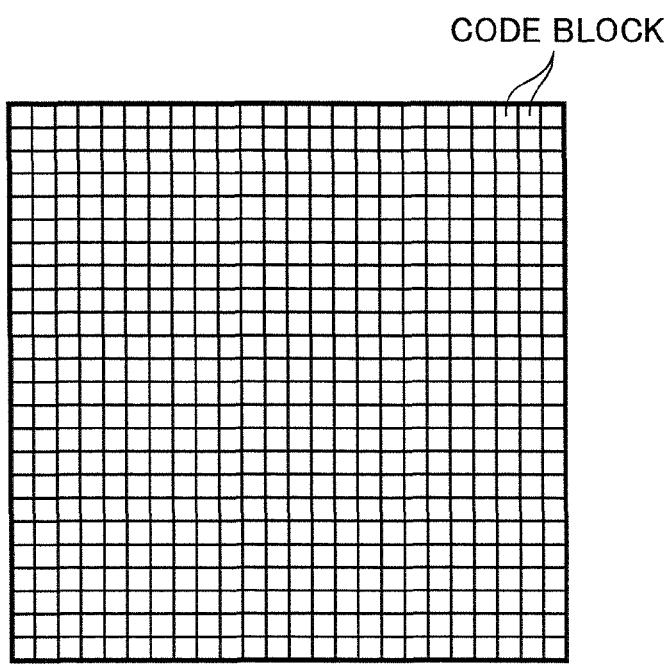
FIG. 7 is a view diagrammatically showing code block division.

Subsequently, the image compressing/decoding unit 17 divides each precinct into further smaller areas called code blocks (code block division 252). FIG. 7 is a view diagrammatically showing the code block division. This code block unit is a basic unit for the entropy coding.

Figure 8:
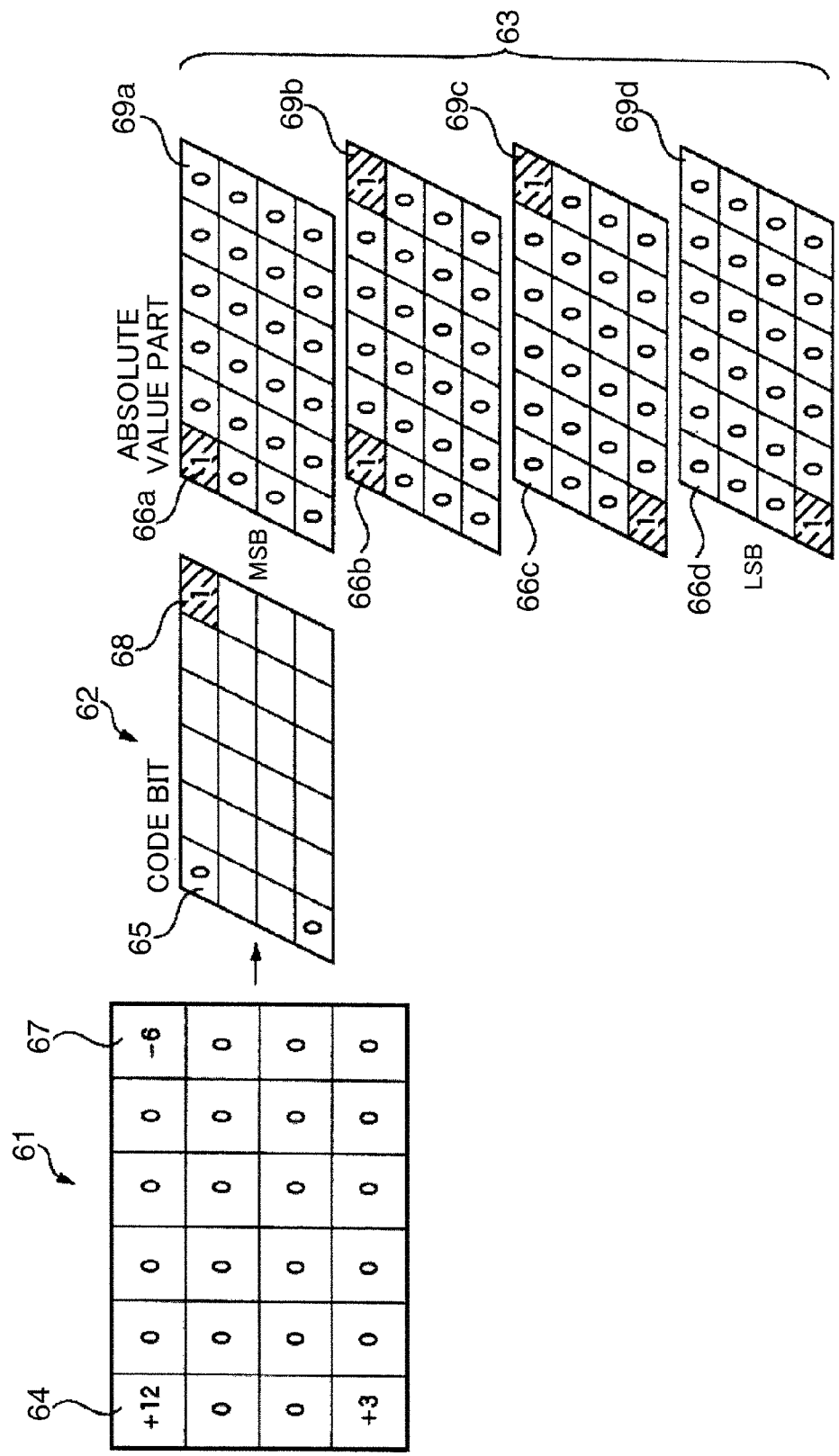
FIG. 8 is a view diagrammatically showing bit plane division.

Then, the image compressing/decoding unit 17 develops the linearly quantized transform coefficient of the discrete wavelet transform for each code block. FIG. 8 is a view diagrammatically showing bit plane development 253. In FIG. 8, identified by 61 is an example of the linearly quantized coefficient data of the discrete wavelet transform in a certain code block. Identified by 62 is a bit string indicating codes of the coefficient data 61, wherein values "0" and "1" respectively mean a positive value and a negative value. Identified by 63 are bit planes obtained by binary development of absolute values of the coefficient data 61 from an MSB (Most Significant Bit) to an LSB (Least Significant Bit).

For example, since a coefficient data 64 having a value of +12 is a positive value, a corresponding code bit 65 is "0". Further, since a binary number representation of the absolute value of +12 is (1100), values at corresponding positions 66a, 66b, 66c and 66d of the bit planes are respectively "1", "1", "0" and "0". Similarly, since a coefficient data 67 having a value of −6 is a negative value, a corresponding code bit 68 is "1". Further, since a binary number representation of the absolute value of −6 is (0110), values at corresponding positions 69a, 69b, 69c and 69d of the bit planes are respectively "0", "1", "1" and "0". A bit plane with all 0s at an MSB side is called a zero bit plane. No data is stored in this bit plane and, on the other hand, the number of zero bit planes to be described later is counted for each code block.

Figure 9:
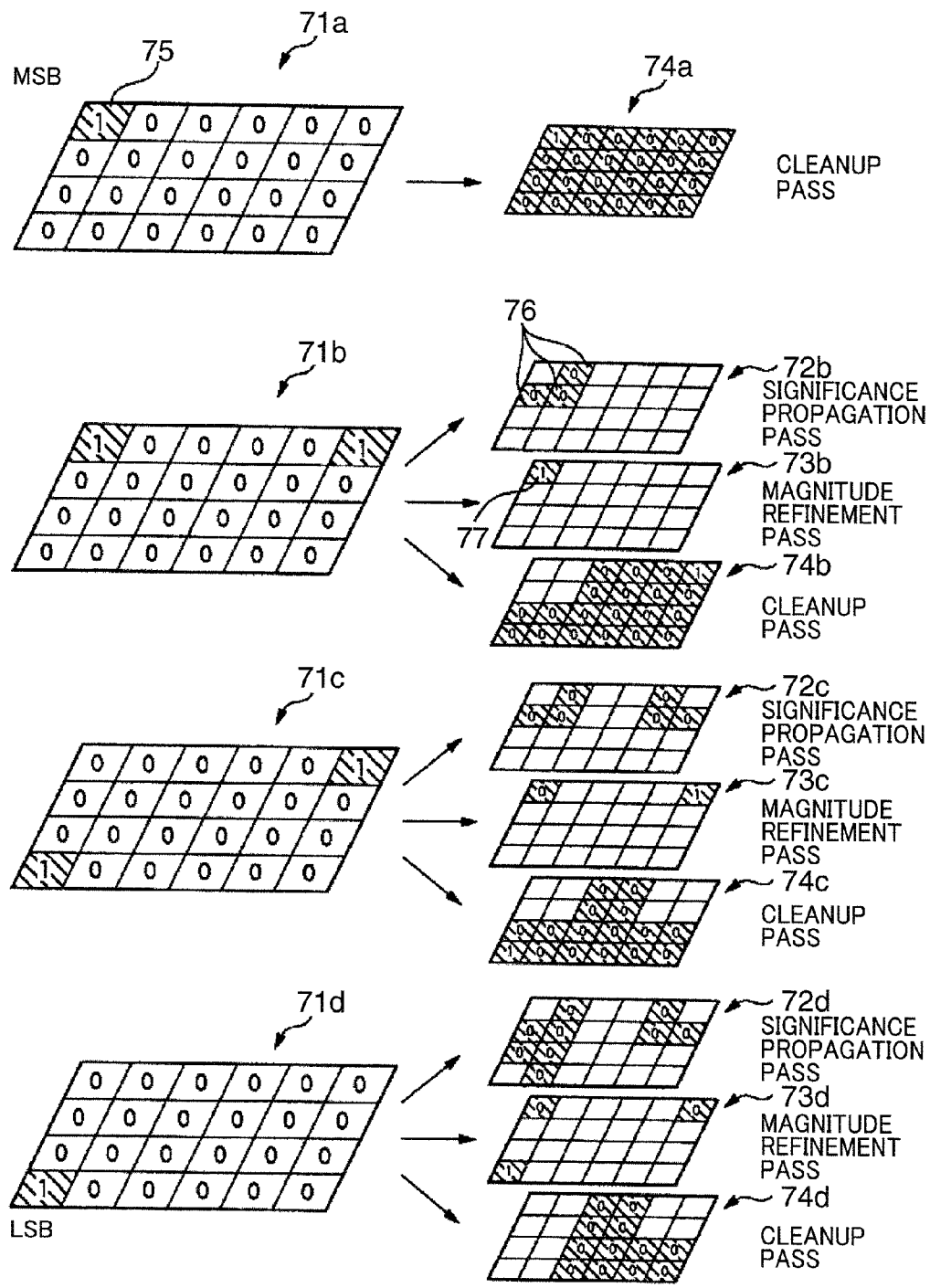
FIG. 9 is a view diagrammatically showing division into coding passes.

Subsequently, the image compressing/decoding unit 17 divides each bit plane into a significant propagation pass, a magnitude refinement pass, and a cleanup pass (division into coding passes 254). FIG. 9 is a view diagrammatically showing the division into the coding passes. As shown in FIG. 9, respective bit planes 71a to 71d (hereinafter, these are collectively called "bit planes 71") are divided into the coding passes as follows. Specifically, the respective bit planes 71 are divided into significant propagation passes 72b to 73d (hereinafter, these are collectively called "significant propagation passes 72"), magnitude refinement passes 73b to 73d (hereinafter, these are collectively called "magnitude refinement passes 73") and cleanup passes 74b to 74d. The bit plane 71a of the most significant bit (MSB side) relates only to a cleanup pass 74a. The cleanup passes 74a to 74d are collectively called "cleanup passes 74" below.

The respective bit planes 71 and the respective coding passes 72 to 74 all have the same size by coordinate lengths in vertical and horizontal directions. Each of the coding passes 72 to 74 includes positions defined by bit values and those not defined by bit values. In FIG. 9, the positions defined by the bit values are hatched (with oblique lines) such as at positions 76, 77. The bit values defined in the hatched parts of the coding passes 72 to 74 (e.g. coding passes 72b to 74b) are equal to bit values at corresponding positions on the bit planes 71 (e.g. bit plane 71b) before division. Since a method for dividing a bit plane into coding passes is known from various documents, it is not described here.

Finally, the image compressing/decoding unit 17 performs arithmetic coding on the data after the division into the coding passes (binary arithmetic coding 255). After the entropy coding 25 is performed as described above, the image compressing/decoding unit 17 adjusts the compression rate (compression rate adjustment 26) and forms an encoded stream used to write a data in a file (coding stream 27). Since this coding stream is known from various documents, it is not described here.

In the compression rate adjustment 26 of a compression algorithm of JPEG2000 shown in FIG. 2, it has been a conventional practice to calculate a degree of influence on image quality for each bit plane, successively output encoded data from the bit planes in order of decreasing degree of influence and perform coding in such a manner that the unencoded bit planes become "0" or "1" data when a compression rate designated by a user or the like is reached (lower bit rounding). However, this rounding had a problem of leading to greater image quality deterioration when the compressed data is decoded.

Accordingly, the present invention proposes a method for suppressing image quality deterioration at the time of decoding by preparing a plurality of different pattern data having the same size as the bit planes and replacing the bit planes, which would be rounded by the compression rate adjustment according to the conventional method, by the pattern data.

Figure 10:
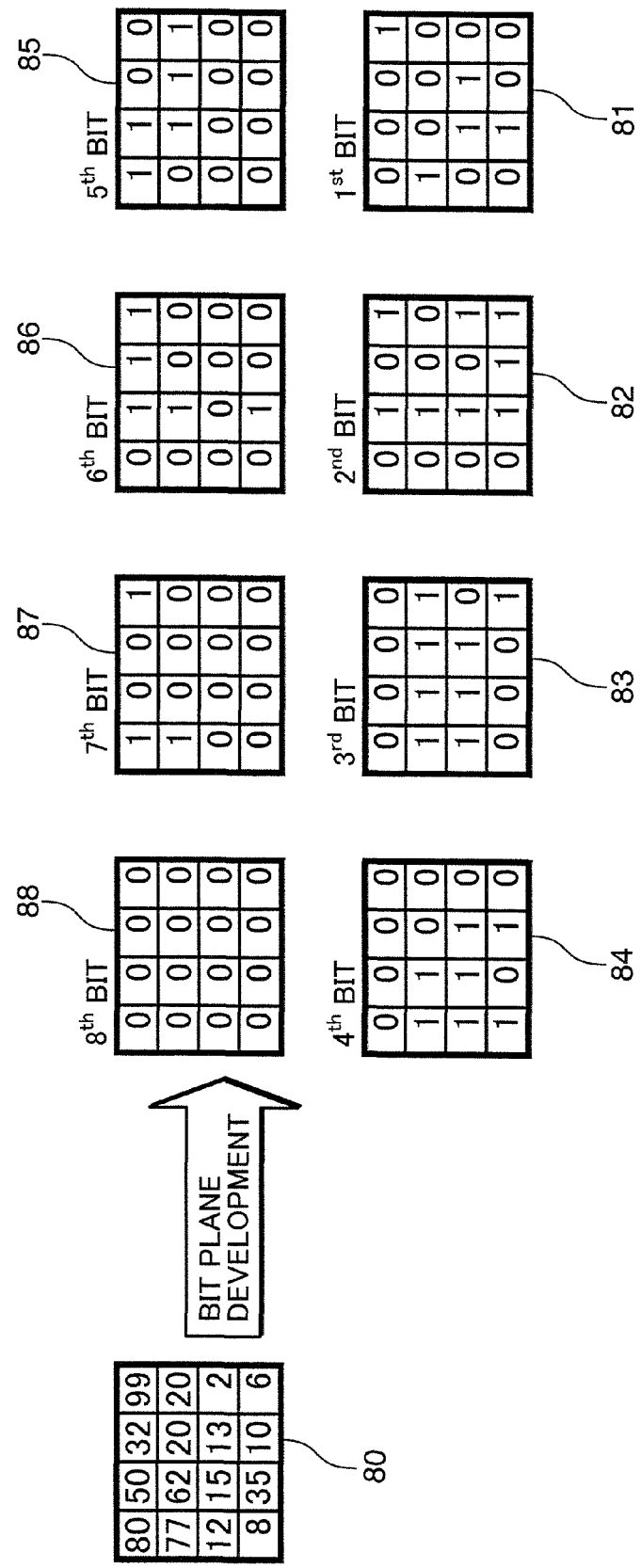
FIG. 10 is a diagram showing bit plane development.

A process of replacing the bit planes by the pattern data is described in detail below. FIG. 10 is a diagram showing bit plane development of an input image data. Here, a 4×4 pattern is described to facilitate description. Identified by 80 is an example of a linearly quantized coefficient data of the discrete wavelet transform in a certain code block. Bit planes 81 to 88 are those obtained by binary development of the coefficient data 80 from the MSB (eighth bit) to the LSB (first bit).

According to the above description, arithmetic coding is performed after the respective bit planes 81 to 88 are divided into coding passes. Here, in order to easily describe the calculation of code amounts, a run-length method, which is a simplest compression method, is described as an example. Since this run-length method is known from various documents, it is not described here.

The image compressing/decoding unit 17 encodes the developed bit planes 81 to 88 using the run-length method. FIG. 11 is a table of encoded data when the bit planes 81 to 88 are encoded by the run-length method. Each number in the table of FIG. 11 indicates a consecutive length of data in order of "0", "1" from the coefficient data at the left end of the uppermost line of the bit plane, and the coefficient data at the right end of one line of the bit plane and that at the left end of the line below it are assumed to be consecutive.

Since the coefficient data are all "0"s in the bit plane 88 of the 8th bit, "0" continues in 16 consecutive bits. In other words, the encoded data is composed of only "16" and the code amount necessary to represent this encoded data is 4 bits. Next, in the case of the bit plane 87 of the 7th bit, "0" continues in 0 consecutive bit, "1" continues in 1 consecutive bit, "0" continues in 2 consecutive bits, "1" continues in 2 consecutive bits and "0" continues in 11 consecutive bits. In other words, the encoded data is "0, 1, 2, 2, 11" and the code amount necessary to represent this encoded data is 4 bits× 5=20 bits. In this way, the image compressing/decoding unit 17 calculates the code amounts of the respective bit planes.

Further, the image compressing/decoding unit 17 calculates a code amount (limited code amount) per code block based on a data amount of the compressed data when the input image data is compressed at the set compression rate. Then, the image compressing/decoding unit 17 successively adds the code amounts of the respective bit planes in decreasing order of the bits to such an extent that the sum does not exceed this limited code amount. For example, the code amount of the compressed data 80 is 8 bits×16 pixels=128 bits. The code amount of one code block calculated by the image compressing/decoding unit 17 based on the data amount of the compressed data when the input image data is compressed at the set compression rate is set at 64 bits. The image compressing/decoding unit 17 successively adds the code amounts of the bit planes in decreasing order from that of the most significant bit to such an extent that the sum does not exceed 64 bits.

Specifically, the image compressing/decoding unit 17 first adds the code amounts of the bit planes of the 8th to 6th bits. Accordingly, 4 bits (8th bit)+20 bits (7th bit)+28 bits (6th bit)=52 bits. Here, if 20 bits, which is the code amount of the bit plane of the 5th bit is added, the sum becomes 72 bits, which exceeds the limited code amount of 64 bits. Thus, the image compressing/decoding unit 17 outputs the encoded data as they are as compressed data for the bit planes 88, 87 and 86 of the 8th, 7th and 6th bits while replacing the encoded data by the pattern data stored in the pattern data storage 122 for the bit planes 85 to 81 of the remaining 5th to 1st bits.

Figure 12:
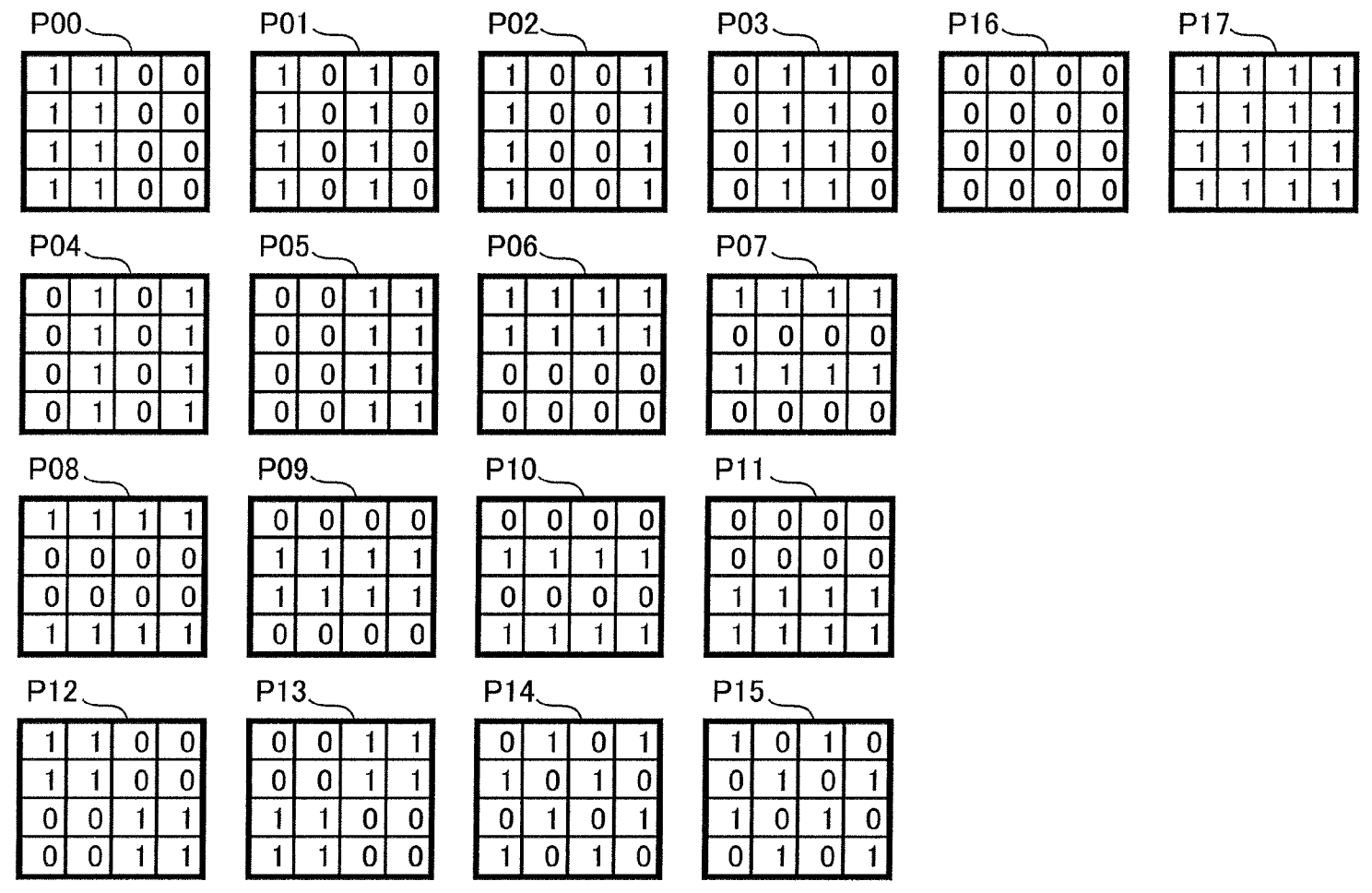

FIG. 12 is a diagram showing an exemplary data configuration of the pattern data storage 122. The pattern data storage 122 stores, for example, pattern data P00 to P15 and pattern data with all "0"s and with all "1"s. Note that the types and number of the pattern data are not limited to these.

In the case of outputting the encoded data as they are as the compressed data for the bit planes 88, 87 and 86 of the 8th, 7th and 6th bits and replacing the encoded data by the pattern data stored in the pattern data storage 122 for the remaining bit planes 85 to 81 of the 5th to 1st bits as described above, the image compressing/decoding unit 17 first selects the pattern data with a highest degree of coincidence from the pattern data storage 122 for each of the bit planes 85 to 81 of the 5th to 1st bits.

How the pattern data is selected is described. First of all, the image compressing/decoding unit 17 performs an exclusive NOR (XNOR) operation or an equivalence (EQ) operation for each pixel corresponding to the bit plane and the pattern data and sets the pattern data with a largest number of true values as the pattern data with a highest degree of coincidence with the bit plane. Alternatively, an AND operation may be performed.

In the case of the bit plane 85 of the 5th bit, the pattern data with a highest degree of coincidence is P06 as a result of performing the exclusive NOR operation or the equivalence operation with the respective pattern data. Accordingly, the image compressing/decoding unit 17 replaces the bit plane 85 of the 5th bit by the pattern data P06. Since there are sixteen pattern data, the respective pattern data can be indicated by different 4-bit identification numbers (0000B to 1111B). In other words, the bit plane 85 of the 5th bit has a code amount of 20 bits (see FIG. 11) with the compression by the run-length method, but can be indicated by the 4-bit identification number by being replaced by the pattern data P06.

By such a method, the image compressing/decoding unit 17 selects the pattern data of the bit planes 84 to 81 of the 4th to 1st bits. As a result, the bit plane 84 is replaced by the pattern data P00, the bit plane 83 by the pattern data P09, the bit plane 82 by the pattern data P04 and the bit plane 81 by the pattern data P16. Since the pattern data P16 is a data with all "0"s, it can be represented by a 4-bit code by the compression by the run-length method.

Figure 13:
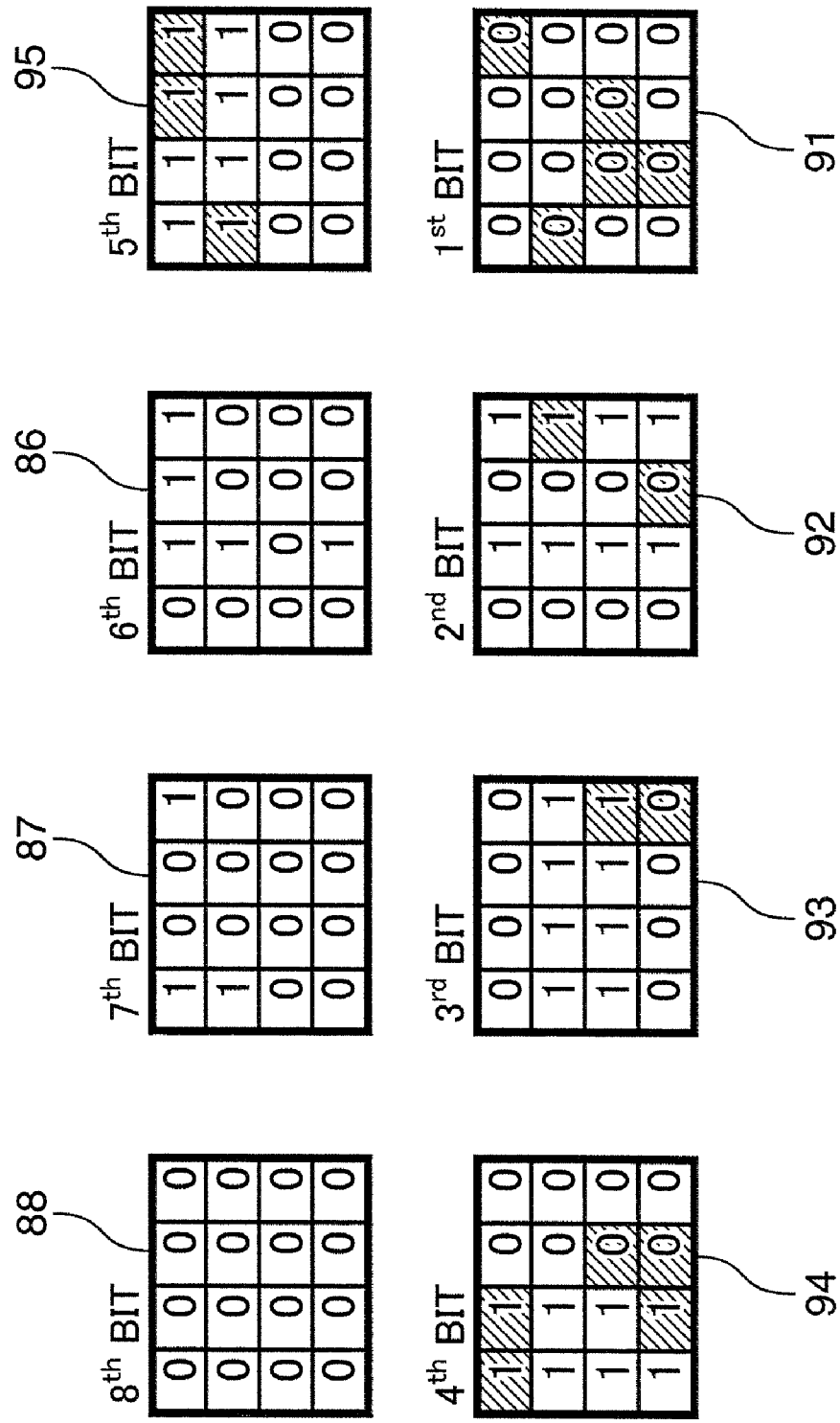
FIG. 13 is a diagram showing respective data after the bit planes are replaced by pattern data.

FIG. 13 is a diagram showing the respective data after the bit planes 85 to 81 of the 5th to 1st bits are replaced by the pattern data. The developed bit planes are used as they are as the encode data for the bit planes 88 to 86 of the 8th to 6th bits, and the bit planes 85 to 81 of the 5th to 1st bits are replaced by the pattern data (encode data 95 to 91) of the pattern data storage 122.

In the encode data 95 to 91 shown in FIG. 13, pixels shown by hatching are pixels with values different from those of the original bit planes 85 to 81. If the bit plane 85 of the 5th bit is replaced by the pattern with all "0"s as by the conventional method, the number of the pixel values different from the corresponding ones (errors) is 5. However, in the case of replacement by the pattern data P06, the number of errors is 3. Thus, the number of errors can be reduced and the quality of the image after decoding can be improved as compared with the conventional method.

Similarly, if the bit plane 84 of the 4th bit is replaced by the pattern with all "0"s, the number of errors is 7. However, in the case of replacement by the pattern data P00, the number of errors is 5. If the bit plane 83 of the 3rd bit is replaced by the pattern with all "0"s, the number of errors is 8. However, in the case of replacement by the pattern data P09, the number of errors is 2. If the bit plane 82 of the 2nd bit is replaced by the pattern with all "0"s, the number of errors is 8. However, in the case of replacement by the pattern data P04, the number of errors is 2.

Figure 14:
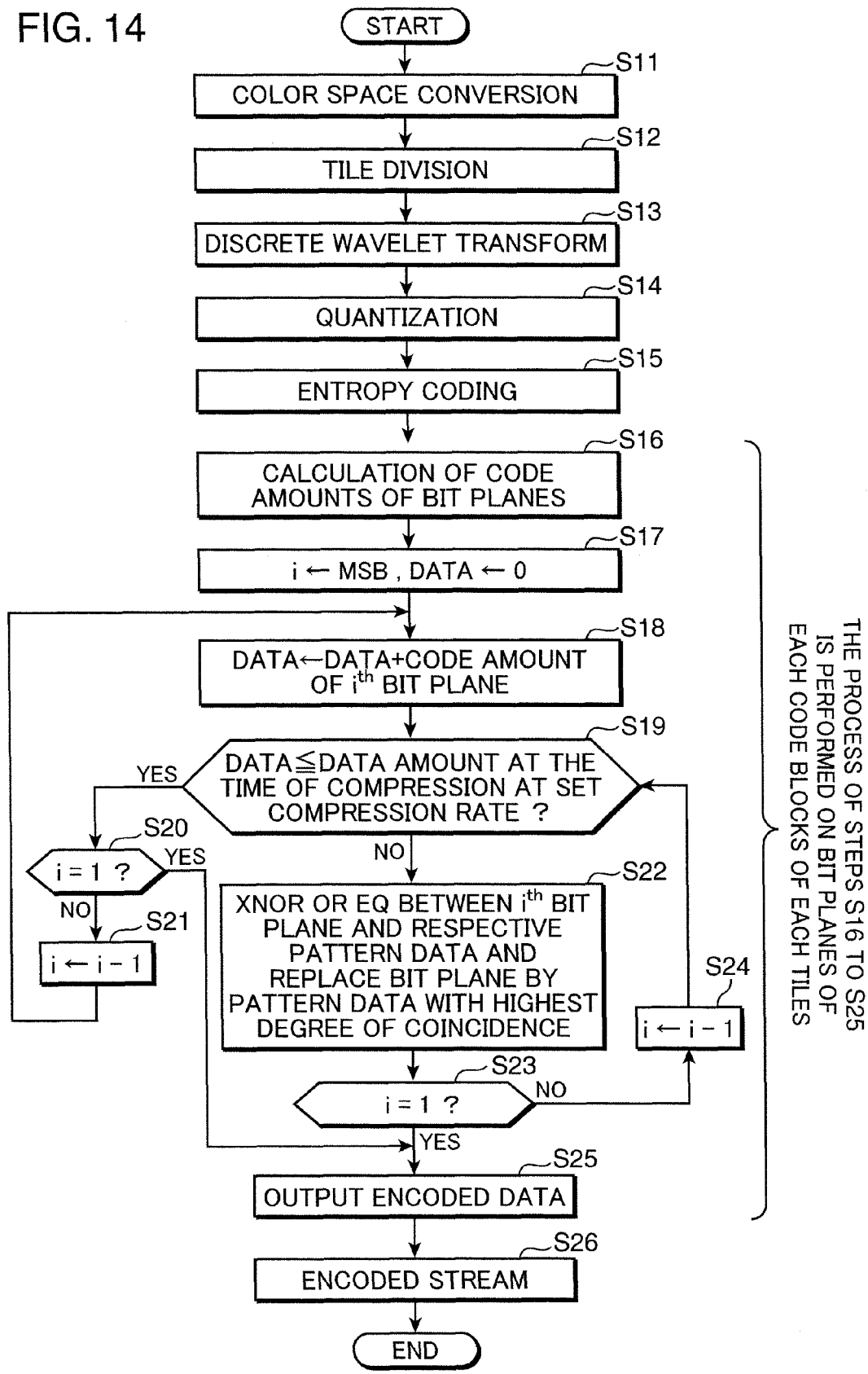
FIG. 14 is a flow chart showing a flow of an image compression process.

FIG. 14 is a flow chart showing a flow of the image compression performed by the image compressing/decoding unit 17 in accordance with the image compression program 121. First of all, the image compressing/decoding unit 17 performs color space conversion of the image data (Step S11), tile division (Step S12), discrete wavelet transform (Step S13), quantization (Step S14) and entropy coding (Step S15). Then, the image compressing/decoding unit 17 calculates the code amounts of the respective bit planes (Step S16). The following process of Steps S16 to S25 is performed on the bit planes of all the code blocks of all the tiles.

Subsequently, the image compressing/decoding unit 17 substitutes the number of the most significant bit (8 in the example of FIG. 10) into a variable i (i is an integer equal to or greater than 1) and 0 into a variable DATA (DATA is an integer equal to or greater than 0) (Step S17). Then, the image compressing/decoding unit 17 adds the code amount of the bit plane of the ith bit to the variable DATA (Step S18). If the value of the variable DATA is equal to or smaller than the limited code amount (YES in Step S19) and the variable i is not 1 (i.e. least significant bit) (NO in Step S20), the image compressing/decoding unit 17 decrements the variable i (Step S21) and proceeds to Step S18. In this way, the code amounts of the bit planes are successively added to the variable DATA in decreasing order from that of the most significant bit and this process is repeated until the value of the variable DATA exceeds the limited code amount or the variable i becomes 1 (i.e. until the code amounts of all the bit planes are added).

When the value of the variable DATA exceeds the limited code amount (NO in Step S19), the image compressing/decoding unit 17 performs an exclusive NOR operation or an equivalence operation between the ith bit plane and the respective pattern data stored in the pattern data storage 122 and replaces the ith bit plane by the pattern data with a largest number of true values (i.e. a highest degree of coincidence) (Step S22). If the variable i is not 1 (NO in Step S23), the image compressing/decoding unit 17 decrements the variable i (Step S24) and repeats the process of Step S22. In this way, the image compressing/decoding unit 17 replaces the bit planes of the bit indicated by the variable i when the value of the variable DATA exceeds the limited code amount to the 1st bit by the pattern data with highest degrees of coincidence.

If the variable i is 1 (YES in Step S20, YES in Step S23), the image compressing/decoding unit 17 indicates the pattern data having replaced the bit planes by the identification numbers stored in correspondence with the pattern data and outputs the pattern data as the encoded data together with the other encoded bit planes (bit plates not replaced by the pattern data) (Step S25). Then, the image compressing/decoding unit 17 forms an encoded stream (Step S26) and outputs the compressed data to complete the process.

Next, a flow of decoding the compressed data is described. First of all, the image compressing/decoding unit 17 performs inverse entropy coding on the compressed data to obtain a quantized data. Subsequently, the image compressing/decoding unit 17 performs inverse quantization on the quantized data to obtain a discrete wavelet converted coefficient data. Then, the image compressing/decoding unit 17 performs inverse discrete wavelet transform on the coefficient data to restore it into a tile image and performs component conversion of the color system of an image obtained by combining the tile images to obtain a decoded data, thereby completing decoding.

By preparing a plurality of different pattern data in the pattern data storage 122 and replacing the bit planes, which would be rounded by the compression rate adjustment according to the conventional method, by the pattern data with highest degrees of coincidence as descried above, the number of errors can be reduced as compared with the conventional method and image quality at the time of decoding can be improved.

Since the pattern data storage 122 stores the respective pattern data and the identification numbers (0000B to 1111B in the above example) with small code amounts while relating them to each other and the replaced pattern data are indicated by the identification numbers, the amount of data after compression can be drastically reduced.

Further, the bit planes of the upper bits generally have a large influence on image quality. Accordingly, the image compressing/decoding unit 17 successively adds the code amounts of the bit planes in decreasing order from that of the most significant bit to such an extent that the sum does not exceed the limited code amount. Thus, the bit planes having a large influence on image quality remain as they are without being replaced by the pattern data, wherefore image quality deterioration after decoding can be suppressed.

In this embodiment, the code amounts are successively added in decreasing order from that of the most significant bit when the image compressing/decoding unit 17 adds the code amounts of the bit planes to such an extent that the sum does not exceed the code amount when the bit plane is compressed at the set compression rate. Besides, the image compressing/decoding unit 17 may calculate degrees of influence of the respective bit planes on image quality and the code amounts of the bit planes may be successively added in order of decreasing degree of influence on image quality.

An exemplary degree of influence of each bit plane on image quality is described. After the respective bit planes are divided into the coding passes, the image compressing/decoding unit 17 sets higher weighting factors for upper bits for the bit planes of from the MSB to the LSB. For example, weighting factors 8, 4, 2, 1 are set for the bit planes of from the MSB to the LSB and also sets specified weighting factors for significance propagation passes, magnitude refinement passes and cleanup passes. Then, the image compressing/decoding unit 17 calculates and adds a numerical value as a product of the number of "1" in the coding pass, the weighting factor of the bit plane and the weighting factor of the coding pass for each bit position and sets the sum as a degree of influence of the bit plane.

Then, the image compressing/decoding unit 17 successively adds the code amounts of the bit planes in order of decreasing degree of influence on image quality to such an extent that the sum does not exceed the limited code amount, selects the pattern data with highest degrees of coincidence with the bit planes other than those whose code amounts were added (i.e. bit planes with lower degrees of influence on image quality) from the pattern data storage 122 and replaces the bit planes by the selected pattern data.

In this way, the image compressing/decoding unit 17 successively adds the code amounts of the bit planes in order of decreasing degree of influence on image quality to such an extent that the sum does not exceed the limited code amount and replaces the bit planes other than those whose code amounts were added to such an extent that the sum does not exceed the limited code amount by the pattern data, whereby the bit planes with higher degrees of influence on image quality remain as they are without being replaced by the pattern data. Therefore, image quality deterioration after decoding can be suppressed.

In short, the present invention is directed to an image compression apparatus, comprising a conversion unit configured to convert the color system of an input image data into the one composed of luminance components and color difference components; a division unit configured to divide the converted image data into a plurality of tiles; a wavelet transform unit configured to perform wavelet transform on each divided tile; a quantization unit configured to quantize each wavelet-transformed tile; a coding unit configured to code the quantized tiles by developing them into bit planes; a storage unit configured to store a plurality of different pattern data having the same data size as the bit planes; a determination unit configured to determine the bit planes having a small influence on image quality after decoding out of the developed bit planes; a selection unit configured to select the pattern data with a highest degree of coincidence with each determined bit plane by comparing the bit plane determined to have a small influence on image quality by the determination unit and the respective pattern data stored in the storage unit; and a replacement unit configured to replace each bit plane determined to have a small influence on image quality by the determination unit by the pattern data selected as the one with the highest degree of coincidence with the determined bit plane by the section unit.

The present invention is also directed to a computer-readable recording medium storing an image compression program for causing a computer to function as: a conversion unit configured to convert the color system of an input image data into the one composed of luminance components and color difference components; a division unit configured to divide the converted image data into a plurality of tiles; a wavelet transform configured to perform wavelet transform on each divided tile; a quantization unit configured to quantize each wavelet-transformed tile; a coding unit configured to code the quantized tiles by developing them into bit planes; a storage unit configured to store a plurality of different pattern data having the same data size as the bit planes; a determination unit configured to determine the bit planes having a small influence on image quality after decoding out of the developed bit planes; a selection unit configured to select the pattern data with a highest degree of coincidence with each determined bit plane by comparing the bit plane determined to have a small influence on image quality by the determination unit and respective pattern data stored in a storage unit for storing a plurality of different pattern data having the same data size as the bit planes; and a replacement unit configured to replace each bit plane determined to have a small influence on image quality by the determination unit by the pattern data selected as the one with the highest degree of coincidence with the determined bit plane by the section unit.

For example, if rounding as disclosed in Japanese Unexamined Patent Publication NO. H05-114240 is performed, image quality is largely deteriorated when a compressed data is decoded. Particularly in the case of an image compressed at a high compression rate, a difference between an initial image and an image after decoding is profound.

However, according to the above respective inventions, the plurality of different pattern data are prepared beforehand in the storage unit and the bit planes, which would be rounded by compression rate adjustment according to the conventional method, are replaced by the pattern data with highest degrees of coincidence with these bit plane selected from the storage unit. Thus, the number of errors can be reduced as compared with the conventional method and image quality after decoding can be improved.

Here, the "number of errors" is the number of pixels whose values differ from corresponding ones when a certain bit plane and a certain pattern having the same size (pattern data stored in the storage unit or pattern data with all "0"s or all "1"s) are compared. The larger the number of errors, the more profound a change in image quality after decoding.

The present invention is also the determination unit includes: a calculator configured to calculate code amounts of the respective encoded bit planes, and an adder configured to successively add the code amounts of the respective bit planes in decreasing order from that of the bit plane of the most significant bit to such an extent that the sum does not exceed a limited code amount calculated based on a data amount of a compressed data obtained when the input image data is compressed at a set compression rate, and the determination unit determines the bit planes other than those whose code amounts were added by the adder to such an extent that the sum does not exceed the limited code amount as bit planes with small degrees of influence on the image quality.

Generally, the bit planes of the upper bits have a large influence on image quality. According to the present invention, by replacing the bit planes other than those whose code amounts were added by the adder to such an extent that the sum does not exceed the limited code amount as bit planes with small degrees of influence on the image quality by the pattern data, the bit planes with high degrees of influence on the image quality remain as they are without being replaced by the pattern data. Thus, image quality deterioration after decoding can be suppressed.

The present invention is also the determination unit includes: a calculator configured to calculate a degree of influence of each encoded bit plane on image quality, and an adder configured to successively add the code amounts of the respective bit planes in order of decreasing degree of influence on the image quality to such an extent that the sum does not exceed a limited code amount calculated based on a data amount of a compressed data obtained when the input image data is compressed at a set compression rate, and the determination unit determines the bit planes other than those whose code amounts were added by the adder to such an extent that the sum does not exceed the limited code amount as bit planes with small degrees of influence on the image quality.

According to the present invention, by replacing the bit planes other than those whose code amounts were added by the adder to such an extent that the sum does not exceed the limited code amount by the pattern data, the bit planes with high degrees of influence on the image quality remain as they are without being replaced by the pattern data. Thus, image quality deterioration after decoding can be suppressed.

The present invention is also the storage unit stores identification information with small code amounts unique to the respective pattern data in correspondence with the respective pattern data, and the image compression apparatus further comprises an output unit configured to indicate the pattern data caused to replace the bit planes by the replacement unit by the identification information stored in correspondence with the pattern data in the storage unit and outputting the pattern data together with the other encoded bit planes as a compressed data.

According to this invention, a data amount after compression can be drastically reduced by indicating the pattern data having replaced the bit planes by the identification information with small code amounts.

This application is based on Japanese Patent application serial No. 2009-197697 filed in Japan Patent Office on Aug. 28, 2009, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image compression apparatus, comprising:
   a conversion unit configured to convert the color system of an input image data into the one composed of luminance components and color difference components;
   a division unit configured to divide the converted image data into a plurality of tiles;
   a wavelet transform unit configured to perform wavelet transform on each divided tile;
   a quantization unit configured to quantize each wavelet-transformed tile;
   a coding unit configured to code the quantized tiles by developing them into bit planes;
   a storage unit configured to store a plurality of different pattern data having the same data size as the bit planes;
   a determination unit configured to determine the bit planes having a small influence on image quality after decoding out of the developed bit planes;
   a selection unit configured to select the pattern data with a highest degree of coincidence with each determined bit plane by comparing the bit plane determined to have a small influence on image quality by the determination unit and the respective pattern data stored in the storage unit; and
   a replacement unit configured to replace each bit plane determined to have a small influence on image quality by the determination unit by the pattern data selected as the one with the highest degree of coincidence with the determined bit plane by the section unit.

2. An image compression apparatus according to claim 1, wherein the determination unit includes:
   a calculator configured to calculate code amounts of the respective encoded bit planes, and
   an adder configured to successively add the code amounts of the respective bit planes in decreasing order from that of the bit plane of the most significant bit to such an extent that the sum does not exceed a limited code amount calculated based on a data amount of a compressed data obtained when the input image data is compressed at a set compression rate, and the determination unit determines the bit planes other than those whose code amounts were added by the adder to such an extent that the sum does not exceed the limited code amount as bit planes with small degrees of influence on the image quality.

3. An image compression apparatus according to claim 1, wherein the determination unit includes:
   a calculator configured to calculate a degree of influence of each encoded bit plane on image quality, and
   an adder configured to successively add the code amounts of the respective bit planes in order of decreasing degree of influence on the image quality to such an extent that the sum does not exceed a limited code amount calculated based on a data amount of a compressed data obtained when the input image data is compressed at a set compression rate, and the determination unit determines the bit planes other than those whose code amounts were added by the adder to such an extent that the sum does not exceed the limited code amount as bit planes with small degrees of influence on the image quality.

4. An image compression apparatus according to claim 1, wherein:
   the storage unit stores identification information with small code amounts unique to the respective pattern data in correspondence with the respective pattern data, and
   the image compression apparatus further comprises an output unit configured to indicate the pattern data caused to replace the bit planes by the replacement unit by the identification information stored in correspondence with the pattern data in the storage unit and outputting the pattern data together with the other encoded bit planes as a compressed data.

5. A non-transitory computer-readable recording medium storing an image compression program for causing a computer to function as:
   a conversion unit configured to convert the color system of an input image data into the one composed of luminance components and color difference components;
   a division unit configured to divide the converted image data into a plurality of tiles;
   a wavelet transform configured to perform wavelet transform on each divided tile;
   a quantization unit configured to quantize each wavelet-transformed tile;
   a coding unit configured to code the quantized tiles by developing them into bit planes;
   a storage unit configured to store a plurality of different pattern data having the same data size as the bit planes;
   a determination unit configured to determine the bit planes having a small influence on image quality after decoding out of the developed bit planes;
   a selection unit configured to select the pattern data with a highest degree of coincidence with each determined bit plane by comparing the bit plane determined to have a small influence on image quality by the determination unit and respective pattern data stored in a storage unit for storing a plurality of different pattern data having the same data size as the bit planes; and
   a replacement unit configured to replace each bit plane determined to have a small influence on image quality by the determination unit by the pattern data selected as the one with the highest degree of coincidence with the determined bit plane by the section unit.

* * * * *